United States Patent [19]

Benderovsky et al.

[11] 3,761,037

[45] Sept. 25, 1973

[54] MECHANISM FOR TRANSPORTING AN INFORMATION CARRIER

[76] Inventors: Vladimir Valerianovich Benderovsky, ulitsa Dymerskaya, 37, kv. 1; Alexandr Ivanovich Schepotiev, Brest-Litovsky prospekt, 112, kv. 39; Igor Alexandrovich Yastrebov, Delegatsky pereulit, 10, kv. 1, all of Kiev; Oleg Mikhailovich Vergiliev, ulitsa Marshala Rybalko, 16, korpus 4, kv. 69, Moscow, all of U.S.S.R.

[22] Filed: Oct. 20, 1971

[21] Appl. No.: 190,903

[52] U.S. Cl. .............................. 242/201, 274/11 D

[51] Int. Cl. ..... B11b 15/32, G03b 1/04, G11b 3/00

[58] Field of Search .................... 242/186, 201-204, 242/67.4; 274/4 D, 11 D

[56] References Cited

UNITED STATES PATENTS

| | | | |
|---|---|---|---|
| 2,943,804 | 7/1960 | Loewe et al. | 242/186 |
| 2,998,939 | 9/1961 | Scott | 242/188 |
| 3,167,264 | 1/1965 | Ohtsu | 242/201 |

*Primary Examiner*—Leonard D. Christian
*Attorney*—Eric H. Waters et al.

[57] ABSTRACT

A mechanism for transporting a carrier of information from one reel to another by means of a drive motor, comprising a unit adapted for reversing the direction of said motor rotation. Said unit incorporates a momentary-action lever with at least one permanent magnet secured thereon and adapted to cooperate with a magnet-controlled contact, and a mechanical counter whose input stage is kinematically connected to one of the reels and the output stage is operatively connected to said momentary-action lever.

The mechanism disclosed herein provides for a reliable automatic cyclic variation of the direction of the information carrier movement with the minimum reversing time.

3 Claims, 3 Drawing Figures

MECHANISM FOR TRANSPORTING AN INFORMATION CARRIER

The present invention relates to the field of computer technology, in particular, to information recording devices of various systems of automatic adjustment, control and registration and, more particularly, to mechanisms for transporting the carrier of information.

The present invention can be employed in devices designed for transporting the information carrier such as magnetic tape, in magnetic recording equipment, in registration and automatic control systems in any branch of transport, in devices for program control over technological processes, production lines, metalworking and other machines, in data accumulators of computers etc.

Especially effective the use of the present invention may be under conditions of a wide range of variations of effective operating factors, for instance, in aircraft whose systems should feature, in particular, very high reliability.

A tendency towards increasing the time of continuous recording and reproduction of information owing to an increase in the length of the information carrier involves an increase of the weight and dimensions of magnetic recording devices, therefore, in such devices use is made of cyclic reversal of the direction of the carrier movement.

Of late, the mechanisms featuring automatic reversal of the carrier movement have found especially wide application in accumulators of flight data in aircraft. In most cases, such reversing mechanisms are complex of design and, as a result, insufficiently reliable, especially so, under conditions of reversing the movement of a finite length carrier.

As a rule, used for automatic control of the operating conditions of the know mechanisms, including the cyclic reversal of the direction of the information carrier movement, are various sensing elements arranged on the information carrier in the form of magnetic tracers, metal foil strips etc., as well as electronic control circuits and actuator elements (electromagnets, electromagnetic relays, etc.). For example, in the known "Device for Controlling the Drive of a Magnetic Tape Recorder" (cf., Japanese Patent No. 40–22222, published January 11, 1968) the control over the mechanism drive is effected by means of control signals supplied from sensing elements provided on the information carrier and made as metallic foil strips. In the electrical circuit of the afore-mentioned device provision is made of guard relays to eliminate the effect of the mechanism's inertia. However, the afore-described known device suffers from considerable disadvantages.

The structural complexity due to the use of elements such as signal receivers, electronic control circuit and actuator elements, all tending to complicate the overall structure of the mechanism, results in a reduced reliability of the device.

In addition, when using magnetic tracers, the inadequate reliability of the device operation at the rates of the information carrier movement close to zero is due to the low magnitude of the electromotive force (usually measured in microvolts).

A slightest increase of the gap between the information carrier and the signal receiver results in the absence of the reversing instruction, likewise reducing the reliability of the mechanism operation. All this serves to preclude the possibility of reducing the rate of the information carrier movement and, consequently, limit the amount of information to be recorded on the carrier.

The above-mentioned disadvantages restrict the area of possible application of such devices, in particular, under conditions of vibrational, impact and other loads, as well as of a wide range of working temperature variations, etc., requiring a high reliability of operation, for example, in aircraft recorders.

It is an object of the present invention to eliminate the afore-listed disadvantages of said known devices.

The invention is aimed at the solution of a technical problem of developing a mechanism designed for transporting the information carrier from one reel to another, that would provide for the possibility of reliable automatic cyclic reversal of the direction of movement of any information carrier with minimum reversing time.

The problem of the invention is accomplished owing to the fact that the mechansm for transporting the information carrier from one reel to another by means of a drive motor connected to one of the reels, having a means adapted for tensioning said information carrier and connected to the other one of said reels, according to the present invention, comprises a unit for reversing the direction of the drive motor rotation, incorporating: a momentary-action lever connected with said motor, at least one permanent magnet secured on said lever and adapted to cooperate with an individual magnet-controlled contact, and a mechanical counter whose input stage is kinematically connected with one of the reels while the output stage is operatively connected with said momentary-action lever.

It is expedient that, in the case of a hydraulic drive motor, its supply circuit incorporate a control valve kinematically coupled with the momentary-action lever, said control valve acting to reverse the direction of said motor rotation depending upon the position of the momentary-action lever.

The mechanism for transporting the information carrier may be placed in a hermetic housing filled with liquid.

For a better understanding of the present invention, presented hereinbelow is a detailed description of an examplary embodiment thereof with due reference to the accompanying drawings, in which.

Figure 1:
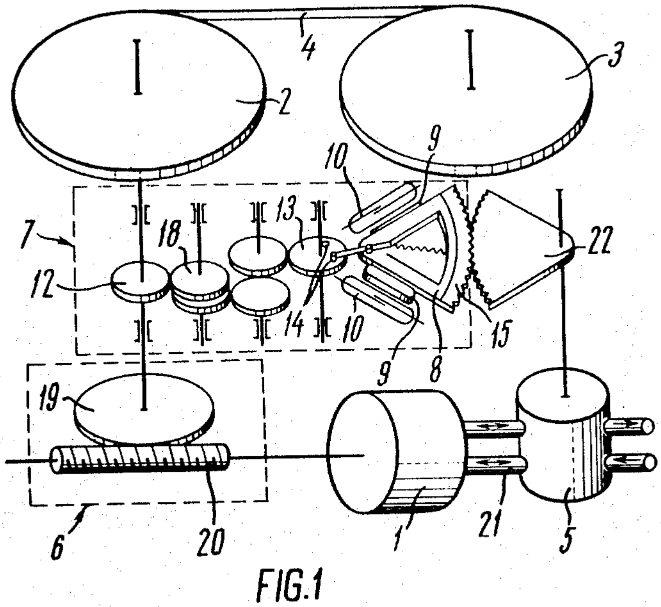
FIG. 1 is a view which illustrates a functional diagram of the mechanism for transporting the information carrier, according to the present invention.

Referring now to FIG. 1 of the drawings, the present mechanism for transporting the information carrier comprises a drive motor 1 which may be electric, hydraulic, pneumatic, etc., however, the embodiment described herein features a hydraulic drive motor 1.

In addition, said mechanism comprises two reels, namely, a take-up reel 2 and a supply reel 3, adapted to accommodate an information carrier 4, a control valve 5, means for tensioning said information carrier (not shown in the drawings), reducing gear 6 and a unit 7 for reversing the direction of rotation of the drive motor 1.

Figures 2, 3:
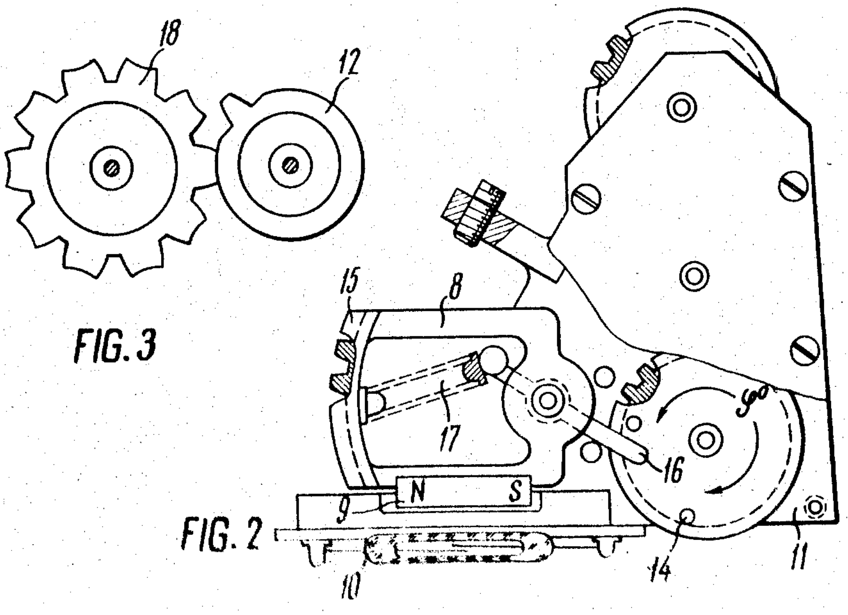
FIG. 2 is a view which illustrates a functional diagram of the unit adapted for reversing the direction of the drive motor rotation in the mechanism disclosed herein.
FIG. 3 is a schematic view which illustrates the gear drive of one of the stages of the last-mentioned unit, with incomplete toothed wheels.

The unit 7 for reversing the direction of rotation of the drive motor 1 (cf., FIGS 1, 2) incorporates a mechanical counter having several stages, a momentary-action lever 8 with permanent magnets 9 secured thereon, and individual magnet-controlled contacts 10. The counter has a housing 11 (FIG. 2) made in the form of two plates and adapted to accommodate said stages. Each stage presents two toothed wheels with a common pivot axle, one of said wheels having teeth but on a portion of the pitch circle (incomplete toothed wheel). As distinct from the rest of the stages, the input stage 12 (FIG. 1) of the counter has an incomplete toothed wheel while the output stage 13 does not have said wheel. Provided on the output stage 13 are pushers 14 whose position depends upon the length of the information carrier 4. On the counter housing 11 is secured the momentary-action lever 8. The latter lever (cf., FIGS. 2 and 3) comprises a frame 15 and a bracket 16, which have a common pivot axle, while rotating independently, and are interconnected kinematically by means of a spring 17. On the frame 15 are mounted the permanent magnets 9. Kinematic connection of the toothed wheel of the second stage 18 of the counter with the incomplete toothed wheel of the input stage 12 is illustrated in FIG. 3. The kinematic connection of any other subsequent stages of the counter is effected in an analogous manner. The counter housing 11 (FIG. 2) mounts the individual magnet-controlled contacts 10 which, in case the housing is made hermetic and filled with liquid, are likewise hermetic.

The supply reel 3 is connected by the information carrier 4 to the take-up reel 2. Set on the shaft of the take-up reel 2 is a worm wheel 19 of the reducing gear 6, which is in mesh with a worm 20. The worm 20 is kinematically coupled with the drive motor 1 which is communicated with the control valve 5 by means of two conduits 21 for the supply and removal of liquid (cf., FIG. 1). The shaft of the take-up reel 2 accommodates the input stage 12 of the counter. The pushers 14 arranged on the output stage 13 of the counter are operatively connected with the bracket 16 (cf., FIG. 2) of the momentary-action lever 8.

In case the drive motor 1 is made hydraulic, the bracket 16 is connected by the spring 17 to the frame 15 which is provided withteeth and meshes with a sector 22 of the control valve 5 of the drive motor 1.

This means that in this particular case the frame 15 is provided with teeth to make for a kinematic connection of the counter with the control valve 5 of the drive motor 1 and the control valve 5 has the sector 22 with analogous teeth, whereas in the case of an electric drive motor 1 there is no need in said controlvalve 5. While so doing, the magnet-controlled contacts 10 have to be connected in the winding circuit of the drive electric motor. The locations of the pushers 14 on the output stage 13 of the counter, depending upon the length of the information carrier 4, are determined by the following relationship:

$$L_{car} = [i(D_o+k\delta)/2]\ \phi + (ik/2)\ \phi^2$$

wherein:

$L_{car}$ is the given length of the carrier (in cm);

$i$ is the gear ratio of the counter (for example, = 1,000 for a four-stage decimal counter, the first stage of said counter being on the shaft of the take-up reel);

$D_o$ is the initial radius of winding the carrier on the take-up reel (in cm);

$\delta$ is the thickness of a single layer of the carrier (in cm);

$\phi$ is the position (spacing) angle of the pushers on the last stage of the counter (in radians);

$k$ is the coefficient of density of the carrier winding.

Positioning the pushers on the output stage of the counter can be illustrated by the following example. Let $D_o = 6$ cm, = 1,000, $\delta = 0.002$ cm, $L_{car} = 120$ cm, $k = 1$.

For realizing the gear ratio equal to 1,000, a four-stage decimal counter should be selected.

On having substituted the given values of the initial data in the above formula and solved the quadratic equation with respect to $\phi$, we obtain $$\phi = 3.83 \text{ rad} = 220°$$

The position of one of the pushers 14, conventionally taken to be the origin of the angle $\phi$, should be made to correspond to the beginning (or end) of the reversible length of the information carrier.

The means adapted for tensioning the information carrier (not shown in the drawings) provides for tensioning the latter in motion.

The interaction of the permanent magnets 9 with the magnet-controlled contacts 10 is effected owing to the magnetic field of the permanent magnets 9.

Following is the principle of operation of the disclosed mechanism for transporting the information carrier.

On switching the mechanism, the working fluid from the supply source, for example, a hydraulic pump, is delivered via the control valve 5 to the drive motor 1. The drive motor 1, by means of the worm 20 and the worm wheel 19, transmits rotation with a preset gear ratio to the take-up reel 2. Upon the rotation of the latter, the information carrier 4 is transported from the supply reel 3 to the take-up reel 2 relative the magnetic heads (not whown in the drawings).

The input stage 12 of the counter transforms the continuous rotation of the shaft of the take-up reel 2 into intermittent rotation of the second stage 18 of the counter so that a single revolution of the second stage 18 of the counter corresponds to as many revolutions of the take-up reel 2 as there are teeth on the toothed wheel (cf., FIG. 3) of the second stage 18. Aanalogously, the rotation is transmitted to the subsequent stages of the counter.

If, for example, a four-stage decimal counter is provided in the mechanism, a single revolution of its output stage corresponds to 1,000 revolutions of the shaft of the take-up reel 2.

The counter (cf., FIG. 1), on having counter a preset number of revolutions of the take-up reel 2, which corresponds to a certain length of the information carrier 4, affects by one of the pushers 14 the bracket 16 of the momentary-action lever 8 which, owing to the effect of the spring 17, momentarily shifts the frame 15 to the opposite extreme position. The sector 22 of the control valve 5, in mesh with the frame 15 of the momentary-action lever 8, momentarily switches over the control valve 5, as a result of which the conduits 21 for the supply and removal of liquid are switched over and, consequently, the drive motor 1 is reversed. After that, the information carrier 4 is transported in the reverse direction.

It is quite obvious that, if necessary, there can be reversed a specific portion of the information carrier 4 of any length taken out of the entire length of the carrier 4.

In case the drive motor 1 is made electric, it is reversed by reversing the excitation windings with the aid of magnet-controlled contacts 10, in which case there is no need for the control valve 5, as pointed out hereinabove. The control over the magnet-controlled contacts 10 is effected owing to the magnetic field of the permanent magnets 9.

In addition, the magnet-controlled contacts 10 can be used for reversing the magnetic recording heads.

The mechanism for transporting the information carrier, incorporating the unit adapted for reversing the direction of the information carrier movement, substantially as described hereinabove, is characterized by a high reliability of operation.

The mechanism for transporting the information carrier, disclosed in accordance with the present invention, can be used most advantageously in flight data recording systems of aircraft, as well as in other means of transportation.

The maximum economic efficiency of the disclosed mechanism for transporting the information carrier is attained when using it in combination with sources of water power.

The possibility of repeated cyclic reversing of the information carrier with a high accuracy in the minimum of time, as well as the provision of the possibility of a reliable operation of the mechanism at the carrier rates of movement close to zero, make for a large volume of recorded information at small overall dimensions and light weight of the mechanism.

In addition, the mechanism according to the present invention is capable of reliable operation under stressed climatic and mechanical conditions.

The simplicity of the mechanism design accounts for a low cost of its manufacture and maintenance.

We claim as our invention:

1. A mechanism for transporting an information carrier, comprising: at least two reels, said information carrier being wound onto one of said reels and from the other one of said reels; a drive motor kinematically rigidly coupled with one of said reels; a means adapted for tensioning said information carrier connected to the other one of said reels; and a unit for reversing the direction of said drive mtor rotation, which incorporates a mechanical counter with at least two stages, namely, input and output stages, of which the input stage is kinematically coupled with the shaft of one of said reels, a momentary-action lever operatively connected to said output stage of said counter, at least one permanent magnet secured on said momentary-action lever, and an individual magnet-controlled contact arranged next to said magnet and adapted to cooperate therewith.

2. A mechanism for transporting an information carrier, according to claim 1, said drive motor being hydraulic, comprising a slide valve incorporated in the supply circuit of said hydraulic motor and kinematically coupled with said momentary-action lever, said slide valve acting to reverse the direction of rotation of said hydraulic motor depending upon the position of the momentary-action lever.

3. A mechanism for transporting an information carrier, according to claim 2, which comprises a housing adapted to accommodate said mechanism, made hermetic and filled with liquid.

* * * * *